UNITED STATES PATENT OFFICE.

JOSEPH B. MARGARIT, OF NEW YORK, N. Y.

IMPROVEMENT IN COMPOSITIONS FOR DESTROYING INSECTS.

Specification forming part of Letters Patent No. 186,260, dated January 16, 1877; application filed October 9, 1876.

*To all whom it may concern:*

Be it known that I, JOSEPH B. MARGARIT, of the city, county, and State of New York, have invented certain new and useful Improvements in Compositions for Destroying Insects; and I hereby declare the same to be fully, clearly, and exactly described as follows:

The invention relates to compositions for the destruction of insects which prey upon plants, especially such insects as belong to the species *Doryphora decemlineata, Doryphora juncta, Philloxera, Cylas formicarius,* and locust; and the said composition consists of the following ingredients, namely: garlic, walnut-hulls, parsley-root, rue-leaves, powdered aloes, protosulphate of iron, and arsenious acid.

In compounding these ingredients I proceed as follows: Four ounces each of garlic and walnut-peels, and two ounces each of parsley-root and rue-leaves, are thoroughly comminuted and mixed together by grinding in a spice-mill, or attrition in a mortar. Two ounces each of powdered aloes and powdered protosulphate of iron, and one dram of powdered arsenious acid, are then added, and being thoroughly incorporated with the other ingredients by stirring or grinding, the composition is ready for use.

In using the above-described composition, it should be applied in any of the following methods: In seeding-grains, &c., it may be mixed directly with the grain, either with or without manure, or the seeds may be steeped for a short time in an infusion of the composition, and then sown by hand or drill, in the usual manner.

When used for the destruction of insects upon shrubs or large growing plants, I first form an infusion of the composition by steeping it in water for about six hours, and then strain off the solution, and sprinkle it over the leaves of the plants in any convenient manner.

When applying the composition for destroying insects upon large fruit-trees, where it would be inconvenient or impossible to properly sprinkle the solution over the leaves, I either strew the solid powdered composition, or spray the infusion above described, over a brazier of live coals, or over a small fire under the tree. The fumes so produced effectually destroy all insects and larvæ on the plant.

Having thus described my invention, what I claim as new, and desire to secure by Letters Patent, is—

The composition herein described, consisting of garlic, walnut-peel, parsley-root, rue-leaves, aloes, protosulphate of iron, and arsenious acid, substantially as and for the purpose herein described.

JOSEPH B. MARGARIT.

Witnesses:
MCGREGOR STEELE,
JOHN JENKINS, Jr.